United States Patent [19]

Wagner

[11] 4,180,137

[45] Dec. 25, 1979

[54] LIQUID-COOLED ENGINE ARRANGEMENT FOR A TWO-WHEELED VEHICLE

[75] Inventor: Gerolf Wagner, Schwebheim, Fed. Rep. of Germany

[73] Assignee: Fichtel & Sachs AG, Schweinfurt, Fed. Rep. of Germany

[21] Appl. No.: 883,325

[22] Filed: Mar. 3, 1978

[30] Foreign Application Priority Data

Mar. 11, 1977 [DE] Fed. Rep. of Germany ... 7707510[U]

[51] Int. Cl.² .............................................. B60K 11/04
[52] U.S. Cl. ................................. 180/229; 180/54 A; 180/68 R; 123/41.57
[58] Field of Search ................ 180/33 R, 33 A, 68 R, 180/54 A; 165/41–44; 123/41.55–41.57

[56] References Cited

U.S. PATENT DOCUMENTS

| 1,312,476 | 8/1919 | Ford | 180/68 R |
| 1,551,144 | 8/1925 | Gilbert | 180/68 R |
| 1,737,353 | 11/1929 | Bock | 180/68 R |
| 2,071,761 | 2/1937 | Nicholson | 180/33 R |
| 3,659,562 | 5/1972 | Jones | 123/41.57 X |
| 4,011,921 | 3/1977 | Sakamoto | 180/33 R |
| 4,016,945 | 4/1977 | Shibata | 180/68 R X |
| 4,019,595 | 4/1977 | Imai | 180/33 R |

FOREIGN PATENT DOCUMENTS

| 904786 | 11/1945 | France | 123/41.57 |
| 16564 | of 1909 | United Kingdom | 180/33 R |
| 390770 | 4/1933 | United Kingdom | 180/33 R |
| 1502946 | 3/1978 | United Kingdom | 180/33 R |

OTHER PUBLICATIONS

"Automobile Engineer", Dec. 1928, p. 474, upper photograph of Water Cooled Tinkler Unit.

*Primary Examiner*—Albert J. Makay
*Assistant Examiner*—Terrance L. Siemens
*Attorney, Agent, or Firm*—Toren, McGeady and Stanger

[57] ABSTRACT

The motor unit of cylinder, cylinder head, and crankcase of an engine arrangement for a two-wheeled vehicle is provided with fastening means for fastening the same to the vehicle frame. A radiator is fixedly fastened to the unit and exposed to the atmosphere and connected by conduits to the cylinder for circulation of a cooling liquid. The radiator is connected to the vehicle frame only through the motor unit.

12 Claims, 3 Drawing Figures

LIQUID-COOLED ENGINE ARRANGEMENT FOR A TWO-WHEELED VEHICLE

This invention relates to water-cooled internal-combustion engines, and particularly to a liquid-cooled engine arrangement for light vehicles, such as motorcycles, mopeds, in a recess of the cylinder head, other typically two-wheeled vehicles.

The bulk of the motor unit mainly consisting of the cylinder or cylinders and the crankcase of such an engine can be reduced if it is cooled not only by cooling ribs on outer cylinder surfaces, but additionally by a radiator and a circulating system which permits a cooling liquid to be circulated through the radiator and a cooling jacket built into the cylinder or cylinders. However, the radiator and the necessary conduits connecting it to the motor unit in conventional engine arrangements occupy much of the space saved by water-cooling, and they make installation and removal of the motor unit for servicing more complex and costly. Also, the radiator and relatively long connecting conduits of the known water-cooled engine arrangements detract from the neater and more pleasing appearance of a corresponding air-cooled engine.

It is a primary object of this invention to provide a liquid-cooled engine arrangement for a two-wheeled vehicle and like applications which is free of the shortcomings of known arrangements outlined above.

With this object and others in view, the invention provides a motor unit including a cylinder, and a cylinder head and crankcase fixedly fastened to respective axial ends of the cylinder. Fastening devices permit the motor unit to be fastened to the vehicle frame. A radiator fixedly fastened in a recess of the unit is exposed to the atmosphere and is connected by conduits to the cylinder for circulation of a cooling liquid between the cylinder and the radiator. Preferably, the fastening devices on the motor unit constitute the sole mechanical connection between the radiator and the frame.

Other features, additional objects and many of the attendant advantages of this invention will readily be appreciated as the same becomes better understood by reference to the following detailed description of preferred embodiments when considered in connection with the appended drawing in which.

Figure 1:
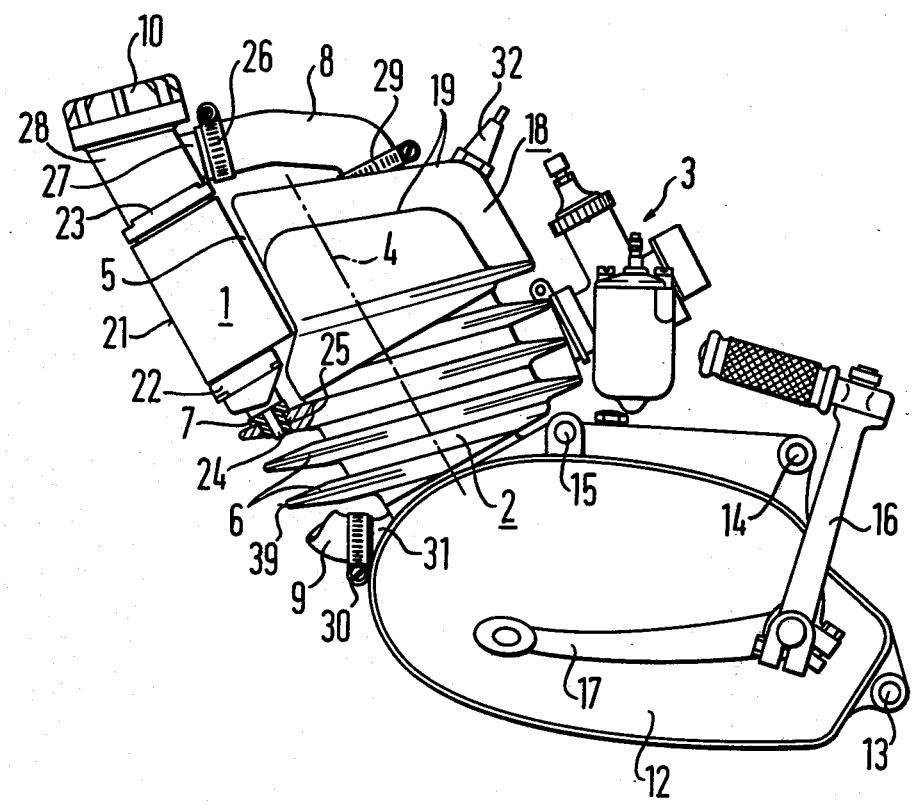
FIG. 1 shows an engine arrangement of the invention in side elevation.

Referring now to the drawing in detail, and initially to FIG. 1, there is seen an internal combustion engine whose cylinder 2 has an axis 4 inclined in an obliquely forward direction relative to the horizontal when the crankcase 12 fixedly fastened to the lower cylinder end is attached to the non-illustrated tubular frame of a motorcycle, moped, or motor scooter by apertured lugs 13,14,15 and by bolts in the lugs engaging corresponding lugs on the vehicle frame.

The cylinder 2 and the cylinder head 18 fixedly fastened to the other axial end of the cylinder are provided with axially spaced cooling ribs 6,19. A carburetor 3 is mounted on the ribs 6 on the rear side of the cylinder 2, and a kick starter 16 and a speed shifting pedal 17 project from the side of the crankcase 12. The cylinder head 18 carries a spark plug 32. The engine elements described so far are too well known to require more detailed description of their structure and function with the exception of the cooling ribs 6,19 which are smaller and/or less numerous than would be necessary if they had to dissipate the entire heat generated in the motor unit.

The cooling ribs 19 on the cylinder head 18 are formed with a recess 5 of a depth sufficient to accommodate a radiator 1 at the front of the motor unit. The radiator is rectangular and horizontally elongated in the front view of FIG. 3. As is evident from FIG. 1, its height is smaller than the horizontal width shown in FIG. 3, and its depth is its smallest dimension. It consists essentially of a lower header or manifold 22 and an upper header or manifold 23, and of a multiplicity of tubes exposed to the atmosphere and connecting the manifolds. The obliquely inclined major front face 21 of the radiator 1 is approximately parallel to the cylinder axis 4 and flush with the front edges 39 of the cylinder ribs 6. Two pins 24 downwardly projecting from the lower header 22 are secured in openings 25 in the rib 6 nearest the cylinder head 18 by interposed resilient bushings 7 which protect the radiator against vibration transmitted from the motor unit.

The upper header 23 is secured to the cylinder head 18 by a heavy, but adequately resilient hose 8 which damps vibration in the same manner as the bushings 25 and secures the top of the radiator in the desired position. A hose clamp 29 fastens one end of the hose 8 to the cylinder head 18, while the other hose end is fastened by a hose clamp 26 to a branch 27 on the filling tube 28 upwardly projecting from the upper header 23 and normally closed by a cap 10.

Figure 3:
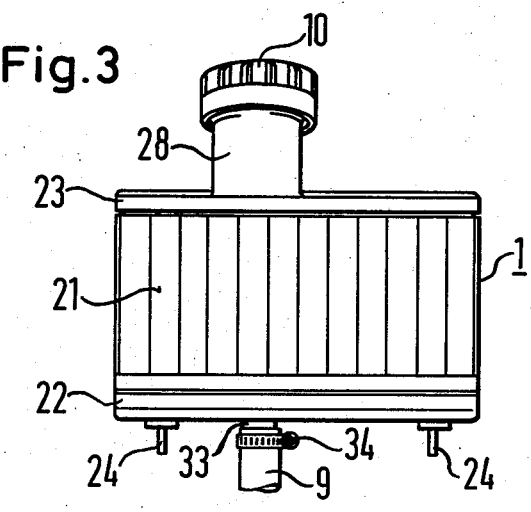
FIG. 3 illustrates a radiator common to both illustrated engine arrangements in front elevation.

Another short hose 9 attached to a nipple 31 on the crankcase 12 by a hose clamp 30 is connected to the lower header 22 by a nipple 33 and a hose clamp 34 broken away in the view of FIG. 1, but shown in FIG. 3. As has been disclosed in more detail in the co-pending, commonly assigned application of Hans Seibt et al., Ser. No. 883,324, filed on Mar. 3, 1978, the hose 9 may lead into a rotary pump in the crankcase 12 from which coolant is conveyed through communicating bores of the crankcase and the cylinder 2 into a cooling jacket in the cylinder wall. The cooling liquid is discharged from the jacket through communicating bores in the cylinder 2 and the cylinder head 18 and the hose 8 into the radiator 1. However, the pumping assembly, more specifically, the impeller and its drive shaft in the non-illustrated rotary pump, may be removed, and the coolant may be circulated through the radiator of the invention and the cylinder by thermal syphoning alone.

Figure 2:
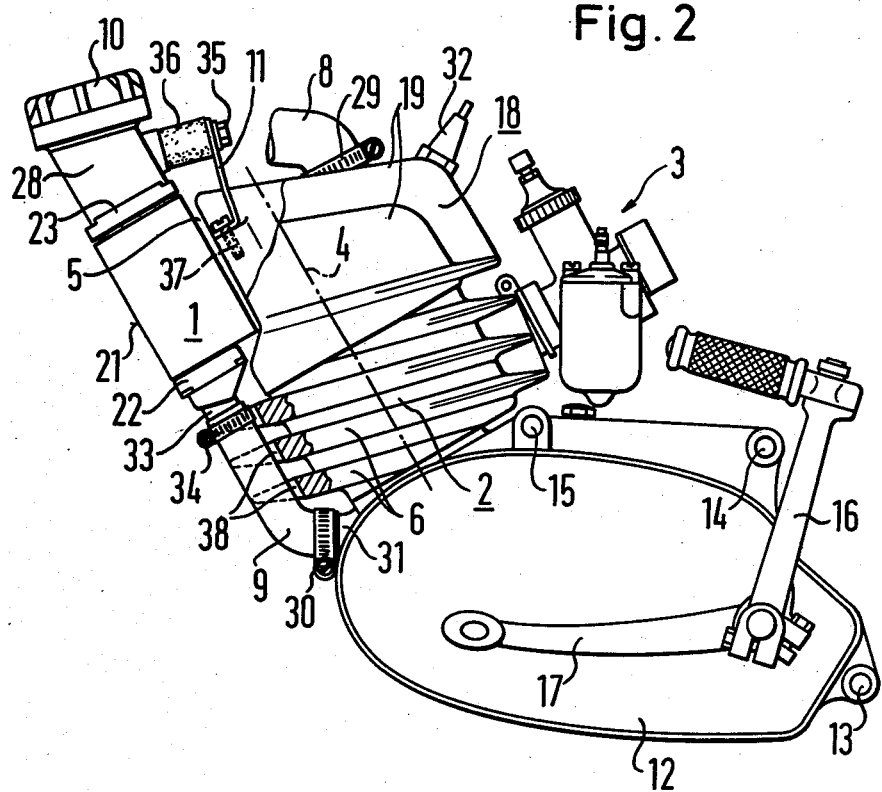
FIG. 2 is a corresponding view of a modified engine arrangement.

The engine arrangement illustrated in FIG. 2 is identical in most respects with the one described above with reference to FIG. 1, and common structure will not again be described except where better seen in FIG. 2 than in FIG. 1. In both embodiments, the ribs 6 on the cylinder 2 are recessed or notched at the front of the motor unit so that the aforedescribed hose 9 is recessed in the notches 38. The hose clamp 34 which secures the upper end of the hose 9 to the radiator 1 obscures the pins 24 and associated elements in FIG. 2, but has been omitted from the showing of FIG. 1.

The engine arrangement of FIG. 2 differs from that described earlier by a bracket 11 which additionally fastens the top of the radiator 1 to the motor unit. One end of the bracket 11 is attached by a fastening screw 35 to a resilient bumper 36 fixedly attached to the filling tube 28. A screw 37 attaches the bracket 11 to the cylinder head 18.

While the two illustrated embodiments of the invention are compact enough to occupy not significantly more space than air-cooled engine arrangements of the same horse-power rating, the mounting of the radiator 1 on the topmost cooling rib 6 of the cylinder 2 provides a vertical flow path for the coolant long enough to permit operation without a circulating pump. The radiator is readily removed together with the motor unit from the vehicle frame, and the hose connections between the radiator and the motor unit need not be disturbed if the motor is to be taken off the frame for maintenance or repair. A heavy hose of synthetic rubber has been found to provide adequate fastening of the radiator top to the motor unit, but a lighter hose may be employed if the bracket 11 is provided in the manner shown in FIG. 2.

It should be understood, of course, that the foregoing disclosure relates only to preferred embodiments, and that it is intended to cover all changes and modifications of the examples of the invention herein chosen for the purpose of the disclosure which do not depart from the spirit and scope of the invention set forth in the appended claims.

What is claimed is:

1. A liquid-cooled engine arrangement for a two-wheeled vehicle and the like including a frame, the arrangement comprising:
   (a) a motor unit including a cylinder having an axis, a cylinder head fixedly fastened to one axially terminal portion of said cylinder and a crankcase fixedly fastened to the other axially terminal portion of said cylinder, said unit being formed with a recess therein;
   (b) fastening means for fastening said motor unit to said frame;
   (c) a radiator fixedly fastened to said unit in said recess and exposed to the ambient atmosphere during movement of said vehicle; and
   (d) conduit means connecting said radiator to said cylinder for circulating a cooling liquid between said cylinder and said radiator.

2. An arrangement as set forth in claim 1, wherein said fastening means constitute the sole means for connecting said radiator to said frame.

3. An arrangement as set forth in claim 1, wherein said radiator has an exposed front face substantially parallel to said axis and directed forward during normal vehicle movement when said motor unit is fastened to said frame.

4. An arrangement as set forth in claim 1, wherein said cylinder head is formed with said recess having a depth approximately equal to the depth of said radiator at right angles to said front face.

5. An arrangement as set forth in claim 1, wherein said cylinder carries a plurality of axially spaced cooling ribs, the arrangement further including first attaching means engaging the cooling rib of said cylinder nearest said cylinder head and an adjacent portion of said radiator, and second attaching means engaging another portion of said radiator axially spaced from said adjacent portion in a direction away from said crankcase and attaching the engaged portion to said motor unit.

6. An arrangement as set forth in claim 5, wherein said first attaching means include a pin member on said adjacent portion, said nearest cooling rib being formed with an opening, and a resilient bushing in said opening receiving said pin member therein.

7. An arrangement as set forth in claim 5, wherein said second attaching means include a resilient member secured to said other portion of the radiator and to said cylinder head.

8. An arrangement as set forth in claim 7, wherein said resilient member is a hose and constitutes an element of said conduit means.

9. An arrangement as set forth in claim 1, wherein said motor unit includes a plurality of externally projecting cooling ribs exposed to said atmosphere, said ribs being formed with said recess.

10. An arrangement as set forth in claim 9, wherein said cylinder and said cylinder head carry respective groups of said cooling ribs, one of said groups being formed with said recess, the ribs of the other group being formed with respective notches receiving a portion of said conduit means.

11. An arrangement as set forth in claim 1, wherein said conduit means include a conduit connecting said radiator with said cylinder head.

12. An arrangement as set forth in claim 1, wherein said radiator has a major face permanently exposed to said atmosphere.

* * * * *